United States Patent [19]

Smith

[11] Patent Number: 5,561,595
[45] Date of Patent: Oct. 1, 1996

[54] POWER INVERTER WITH INPUT LINE CONDITIONING

[75] Inventor: Gerald L. Smith, Torrance, Calif.

[73] Assignee: Magl Power Inc., Torrance, Calif.

[21] Appl. No.: 409,869

[22] Filed: Mar. 24, 1995

[51] Int. Cl.$^6$ .................................................. H02M 5/458
[52] U.S. Cl. ............................................. 363/37; 363/132
[58] Field of Search ............................... 363/34, 37, 40, 363/41, 132, 137

[56] References Cited

U.S. PATENT DOCUMENTS

| | | | |
|---|---|---|---|
| 3,939,387 | 2/1976 | Maeda | 363/37 |
| 5,008,801 | 4/1991 | Glennon | 363/132 |
| 5,172,310 | 12/1992 | Deam et al. | 363/132 |
| 5,287,260 | 2/1994 | Uchino | 363/37 |

Primary Examiner—Jeffrey L. Sterrett
Attorney, Agent, or Firm—Monty Koslover Assoc.

[57] ABSTRACT

A three-phase ac power inverter incorporating circuits which operate to correct input power factor to near unity when connected to an ac input rectifier, while also reducing input harmonic distortion. The inverter includes a dc capacitor connected between buses, and three, four-pole inverter H-configuration bridges which output ac phases A, B and C. The cross-bar of each H-bridge is made up of an L-C filter. The inverter bridge switches, switching in an output Pulse Width Modulation mode for generating three phase sine waves, also serve to pump resonant energy between the L-C filter in each bridge and the dc capacitor. Phase A, B and C inverter bridges are pumped at the same carrier frequency, providing a continuous feed to the dc capacitor and the input rectifier. In effect, this action extends the conduction angle of the input rectifier, resulting in the input power factor being corrected to near unity. The pumping action through the L-C filters also filters and reduces the input harmonic distortion.

1 Claim, 2 Drawing Sheets

Fig. 1. (prior art.)
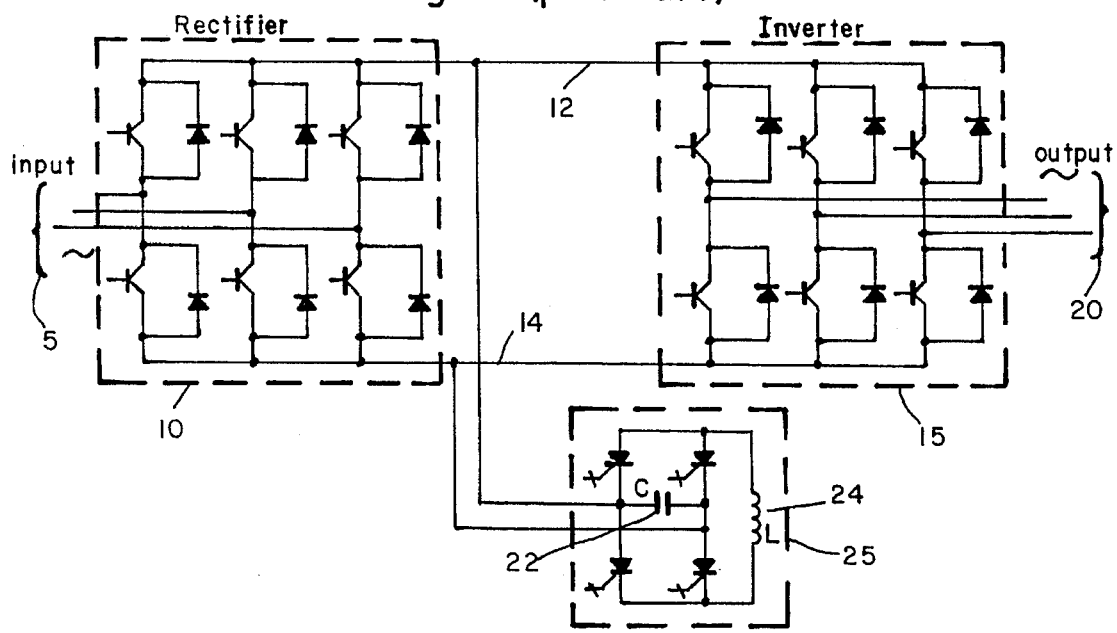
Fig. 3.
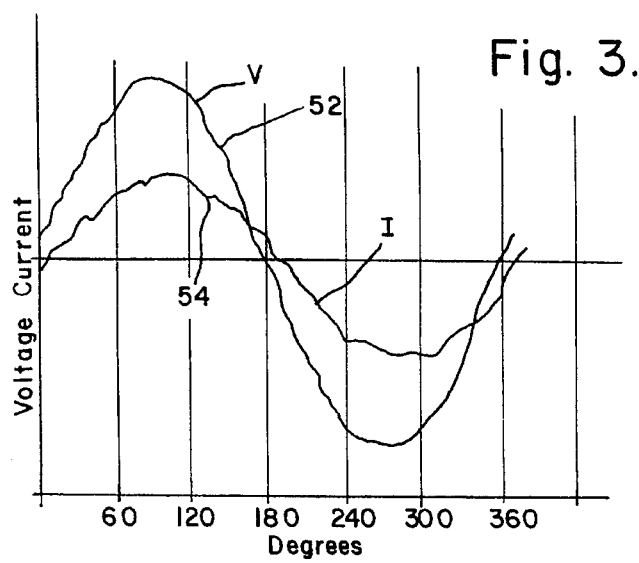
Fig. 4.
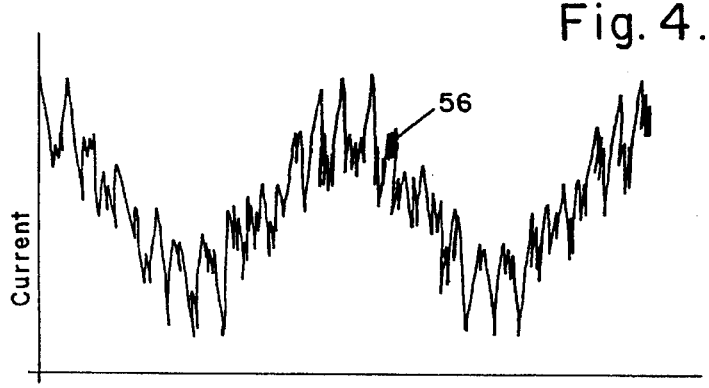

POWER INVERTER WITH INPUT LINE CONDITIONING

BACKGROUND OF THE INVENTION

1. Field of the Invention

This invention relates to solid-state power converters, and more particularly to the inverter portion of a converter which incorporates means for power conditioning the input ac line.

2. Prior Art Background

Power factor as defined in sinusoidal waveform terms=KW/KVA and characterizes the power being delivered to a load, both real and reactive. A purely resistive load will have a unity power factor, indicating a simple transfer of energy to the load resistance. If the load is partially or wholly inductive, the load power factor will be less than unity. For example, a load motor startup could reduce the power factor to 0.6 pf or less. Non-linear switching loads can also reduce the power factor. This produces a reactive component that will circulate between the load and the supply causing losses related to the magnitude of the reactive component.

Aircraft loads, while on the ground, generally include inductive components, producing a low power factor on the supply line. In addition, the ground supply output harmonic distortion may be considerable, depending on the type of loads and other factors. Thus, a power converter which converts power from a source, and in turn supplies an aircraft load, must process a low input power factor and usually an appreciable harmonic distortion in the source. This process results in a lowered converter efficiency and significant line power losses.

The methods of solving this problem include at least two approaches: One method is to insert a line conditioner in the source supply line and seek to correct the harmonic distortion and/or the input power factor in this manner. Such line conditioners are available and well known in the industry. Another method is to incorporate a means for correction of the input power factor and/or harmonic distortion into a power converter circuitry. This approach, although not so well known, has been described in the technical literature. One approach, which is credited to Dr. Robert Hoft of the University of Missouri, utilizes an active filter which is connected to the dc link between the rectifier and the inverter of a converter, replacing the electrolytic capacitor. The active filter, which comprises switches, an inductor and capacitor, acts to absorb and counteract the harmonic currents. It is not known, however, to have a significant corrective effect on the input power Factor.

Similarly, no state-of-art power converters are known to incorporate a means of correcting input power factor and/or harmonic distortion without also incurring severe penalties such as instabilities in control, restrictions on output power and additional required EMI filtering.

There is thus a need for a power converter which incorporates both input power factor and harmonic distortion correction without incurring penalties, and which is efficient, reliable and low in operating cost.

SUMMARY OF THE INVENTION

The invention is a three phase inverter which is intended to be combined with an input ac rectifier, an output filter and a three-phase output transformer in a power converter configuration. The invention inverter comprises three identical four-pole switching H-bridges, and a dc filter capacitor connected between the dc buses. The H 'cross-bar' of each H-bridge comprises an inductor (L) and capacitor (C) which are connected in series, the center point between the L and C forming the bridge output for phase A, B or C. The capacitors in each bridge are connected in series with each other in a closed loop. The L-C combination and values are selected together with the dc filter capacitor to produce a certain pumping frequency when the H-bridge solid-state switches are switching in their normal PWM mode. This pumping action in each bridge, reinforced by the looped capacitors, produces a high frequency waveform which rides on the dc ripple current and is conducted through the switch diodes to the positive and negative dc buses, resonating with the dc filter capacitor in resonant loops. These resonant currents are also conducted forward to the converter input rectifier, and act to extend the conduction angle of the rectifier.

The interaction of the inverter-generated resonant currents with the input rectifier produces current phase shifting toward a near unity power factor and smoothing of the three-phase voltage and current waveforms, reducing harmonic distortion significantly. Typically, 0.6 pf lagging inputs have been corrected to 0.95 pf lagging and harmonic distortions reduced to less than 3 percent total, thereby conditioning the input line.

The added L-C components dissipate little power so that the normal switching losses of the inverter bridges are increased by a small amount. This is more than offset by the considerable decrease in overall converter losses due to the correction of the input power factor to near unity. The invention inverter therefore, will significantly improve the efficiency of any converter in which it is incorporated.

Accordingly, it is a principal object of this invention to provide a power inverter that incorporates means for the correction of input power factor and input harmonic distortion.

Another object is to provide a power inverter that will greatly improve the power efficiency of any converter in which it is incorporated and which processes a low input power factor.

An advantage of the invention is that sub-cyclic correction is made automatically, providing compensation for non-linear loads.

Another advantage is that as compared with other means of input power factor correction, the invention controls are simple with no additional external voltage/current sensing required.

Further objects and advantages of the invention are discussed in the description of the preferred embodiment and claims and will become apparent from a study of the drawings.

BRIEF DESCRIPTION OF THE DRAWINGS

FIG. 1 is a simplified schematic diagram of a prior art rectifier/inverter combination that includes an active filter which is intended to correct the input harmonic distortion and possibly the input power factor;

FIG. 3 shows voltage and current traces for an input power phase, taken during a test of the invention inverter, and useful in showing the power factor correction to near unity due to the invention; and FIG. 4 is part of a current trace on the dc link bus, particularly showing a high frequency resonant current riding on the dc ripple current waveform, and useful in understanding the operation of the invention active filter pumping action.

DESCRIPTION OF THE PREFERRED EMBODIMENT

Figure 2:
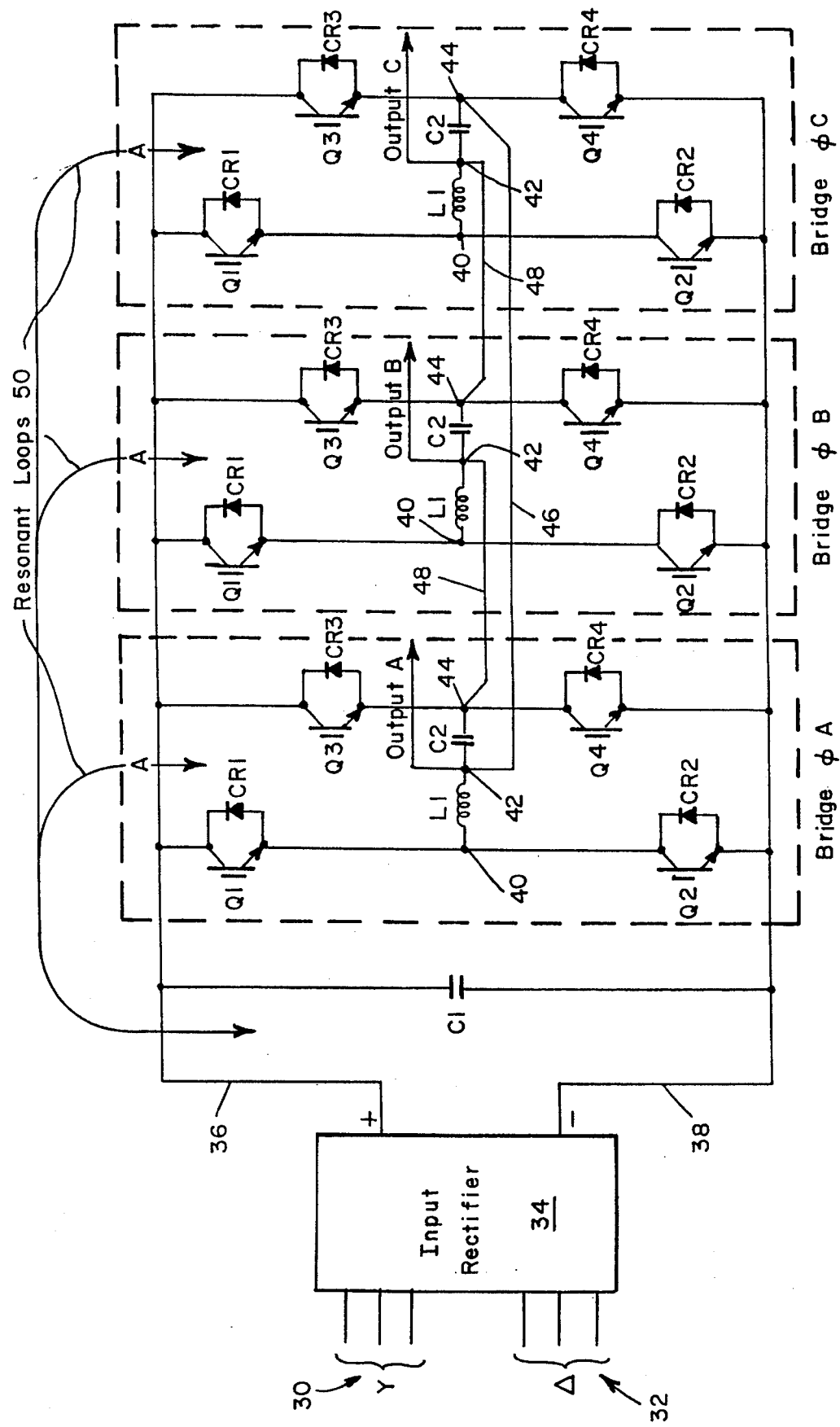
FIG. 2 is a simplified circuit diagram of a three-phase power inverter according to the present invention, particularly showing, for clarity, the inverter relationship to an input rectifier which would be part of the converter incorporating the inverter.

Referring particularly to the drawings, there is shown in FIG. 1 a simplified circuit diagram of a prior art rectifier 10 and inverter 15 incorporating an active filter 25. This approach of using an active filter to correct harmonic distortion is attributed to Dr. Robert Hoft at the University of Missouri. From left to right, the circuit consists of a switching three-phase rectifier 10 which accepts a three-phase ac input 5, and outputs a ripple dc on positive 12 and negative 14 dc link buses which connect to a three-phase inverter 15. The inverter 15 outputs ac power 20 at whatever frequency is selected by the designer.

Connected across the dc link buses 12, 14 is an active filter 25 consisting of an H-switching bridge connected in parallel with an inductor L 24. A capacitor C 22 serves as the H-bridge cross-bar. In order to operate adequately, it is essential that a Sine PWM mode of operation be used for the filter switches.

In operation, the switches in the filter H-bridge are driven in response to sensed input voltages and currents, and together with the L-C combination 22, 25, produce a waveform to counter the harmonic currents generated by and passed through the rectifier and inverter. The active filter replaces a standard electrolytic capacitor and absorbs harmonic currents to maintain a smooth dc voltage at the dc link. The ac output of the inverter will also then be smoother, with lower harmonics.

It is not clear whether the active filter-generated currents which are transmitted along the dc link buses to the rectifier, also act to shift the current phases. This filter action has not been established.

The type of active filter illustrated in FIG. 1 and shown in a rectifier/inverter combination has been investigated and apparently has a number of disadvantages. These may be listed as follows:

1. A complex control system is required, including multiple sensing locations for voltage and current.
2. Output power is restricted by high filter currents, high frequency switching and thermal management problems.
3. A large inductor is required in the active filter.
4. The system tends to instability on start-up.
5. The system is sensitive to unbalanced or non-linear loads.
6. An EMI filter is required.
7. A complex busing is required because of the Sine PWM generated by the configuration.

These and other disadvantages make the prior art approach unsuitable for general use with inverters. The invention embodiment which is described herein, is therefore put forward as solving the problems posed by input harmonic distortion and low input power factor, without the foregoing disadvantages.

Refer now to FIG. 2 which is a simplified circuit diagram of a three-phase power inverter according to the present invention. An input rectifier block 34 is also shown to illustrate the important relationship of the inverter with the input rectifier. It should be noted that this inverter is intended to be incorporated in a power converter which includes at least an input rectifier providing the dc input to the inverter, an output filter to process the inverter PWM output waveform into a sinusoidal waveform, and an output transformer. These are all necessary sections of any ac power converter, and the inverter operation is best understood in this context.

The inverter design is based on the premise that an active filter action can be produced by the normal PWM switching of inverter solid state switches acting together with a selected L-C combination. This phenomenon, together with the creation of resonant current loops through each inverter bridge, the dc buses and an input dc capacitor, is at the heart of the invention.

No additional active filter, as described in the prior art discussion is required.

Referring again to FIG. 2, the invention inverter comprises a dc capacitor C1 which is connected between the positive and negative dc buses 36, 38, and three identical four pole, H-configuration switching bridges (H-bridges) which serve as inverter bridges for phase A, B and C. The inverter H-bridges are connected in parallel between the positive and negative dc buses 36, 38.

Each H-bridge comprises four solid-state switches, Q1, Q2, Q3 and Q4, an inductor L1 and a capacitor C2. These components are all connected by power buses. Integrated in each solid-state switch is a diode connected in reverse conduction with the switch. These diodes are shown in FIG. 1 and designated CR1, CR2, CR3 or CR4 depending on the switch in which they are integrated.

The inductor L1 and capacitor C2 are connected in series, and the L-C combination is connected between the center points 40, 44, of each side of the H-bridge, forming four quadrants; each quadrant containing a solid-state switch. The bridge output is connected to the center point 42 between inductor L1 and capacitor C2. Each capacitor C2 is connected 46, 48 to each of the other capacitors C2 in other bridges in a series loop.

The solid-state switches are power transistors having high frequency switching capability. Any type switch capable of switching a pulse-width modulated (PWM) output waveform may be used. The capacitors however, are selected so that the capacitance ratio of dc capacitor C1 to filter C2, C1/C2=1.25±10%. This is necessary for correct operation. Further, the inductor L1 in each bridge is selected so that the L1-C2 combination will produce a pumping rate frequency in the range of 1500 Hz to 2000 Hz, with near 2000 Hz having the best resulting effect on the input power factor. A practical lower limit of pumping frequency, but not recommended, depends on the input rectifier and input ac frequency. Thus, for a 12 pole input rectifier and a 60 Hz frequency, the lower pumping frequency limit=12×60=720 Hz. Operation near the lower limit pumping frequency is not recommended in view of the diminished input power factor and harmonic correction that will result.

Operation of the inverter is as follows: Three-phase, 60 Hz or other frequency sinusoidal power Wye 30 or Delta 32 connected enters at left into an input rectifier 34 which outputs a ripple dc voltage on a positive 36 bus with respect to a negative 38 dc bus. These dc buses are connected input to the inverter.

Across the dc buses is a capacitor C1 which terminates reactive power. In each H-bridge, the solid-state switches Q1, Q2, Q3 and Q4 are switched in pulse width modulation (PWM) action, and in a sequence, switch the bus potential positive and negative at a fixed frequency for output. For a frequency converter, this output power frequency may be 400 Hz. Diodes CR1, CR2, CR3 and CR4 which are reverse connected with respect to switch conduction, serve to provide a connection to the dc buses for reactive power flow.

The switching of the solid-state switches in PWM action in each H-bridge and the flow of current from quadrant to quadrant, pumps resonant energy from the L1-C2 combination, through the reverse diodes and to the dc capacitor C1 in resonant loops 50. The resonant currents at a frequency between 1500 Hz and 2000 Hz, ride on the dc ripple current in the dc buses, and feedback to the input rectifier 34 where the feedback extends the conduction angle of the individual rectifiers. As a result, the input current phases are shifted until near or coincident with the input voltage phases. The input power factor is thus corrected and the link between the outputs and the L1-C2 combinations filters the input harmonics which are smoothed further. The L1-C2 combinations in each bridge, phases A, B and C, are pumped at the same carrier frequency, providing for a continuous feed to dc capacitor C1.

FIGS. 3 and 4 taken from test data for the inverter, respectively illustrate corrected input power waveforms and a resonant dc current flow. In FIG. 3, the current 54 is seen to lag the voltage 52 by only a few degrees, and the input power factor is about 0.95 pf which was corrected from 0.7 pf. Other oscilloscope photos taken during subsequent test of the inverter, show that there is no change in power factor with a load step from 50% load to 100% rated load. The input power factor remains about 0.95 pf. The measured input harmonic distortion was also about 3% total.

In FIG. 4, the resonant current 56, taken on the positive dc bus and reflected back to the C1 dc capacitor, can be clearly seen riding on the dc ripple current. The resonant current itself is of relatively low amplitude and represents little power. For this reason, the inductances L1 and capacitors C2 need to be only large enough to pass the rated bridge output current plus a small margin. Power losses and thermal dissipation due to the L1-C2 combinations are small.

Regarding the inverter general operating characteristics under test, the following is noted: The unit has an inherent soft start, with smooth ramped correction of the input power waveform within a few cycles of start. The inverter output shows high stability. The invention inverter efficiency is greater than 90% at full rated load. This compares with 80% efficiency which is typical for alternative, state of the art inverter configurations. The inverter shows sub-cyclic correction of the input waveform even under non-linear loads.

From the foregoing description and results of testing, it is believed that the preferred embodiment achieves the objects of the present invention. Various modifications and changes may be made in the circuits described herein above which are apparent to those skilled in the art. All such modifications and changes are considered to be within the scope of the appended claims and are embraced thereby.

Having described the invention, what is claimed is:

1. A circuit for inverting dc power from an ac input rectifier, producing a three-phase ac output, and for conditioning the ac input power, said circuit comprising:

a positive dc bus and a negative dc bus connected to the output terminals of said input rectifier;

a first capacitor, connected between said positive dc bus and said negative dc bus, and acting to exchange reactive power from said input rectifier; and three, four-pole inverter bridges, said inverter bridges being connected in parallel between said positive dc bus and said negative dc bus; each said inverter bridge being connected in an "H" configuration and comprising four solid-state switches, an inductor and a second capacitor; one of each said solid state switches occupying an "arm" or "leg" of said "H" configuration, providing four switching quadrants, said inductor and said second capacitor being connected in series L-C filter combination, said L-C filter combination being connected between the center points of two sets of said solid-state switches and forming the cross-bar of said "H" configuration; an inverter bridge output terminal being formed at the connection between said inductor and said second capacitor; each said second capacitor also being connected in series with a second capacitor in the other said inverter bridges in a continuous loop;

said solid state switches operating in a pulse width modulation (PWM) mode and producing an ac wave output from each said inverter bridge at said output terminal;

said first capacitor designated C1 and said second capacitor designated C2 and having a selected C1/C2 capacitance ratio of 1.25:1 within ±10%;

said L-C filter combination inductance-capacitance values selected to produce a current pumping frequency in the range of 1500 Hz to 2000 Hz when said solid state switches are operating in said pulse width modulation (PWM) mode;

each said inverter bridge operating to pump resonant energy between each said L-C filter combination and said first capacitor in resonant loops; said resonant energy feeding back to said input rectifier and acting to extend the conduction angle of said input rectifier, resulting in a current phase shift in all ac input lines to said input rectifier towards coincidence with the voltage waveforms and towards unity power factor input; said L-C filter combination also acting to filter the input harmonic distortion.

\* \* \* \* \*